March 25, 1958　　W. F. THOMPSON　　2,828,407
DIMLIGHT INDICATOR
Filed Aug. 30, 1956
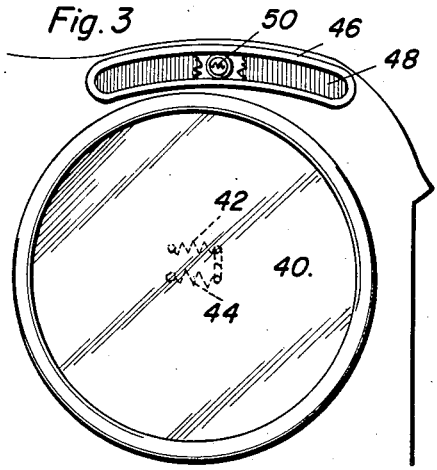
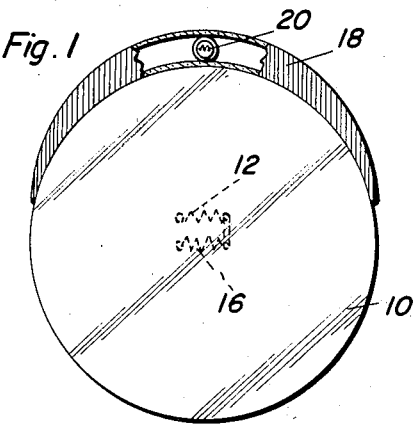
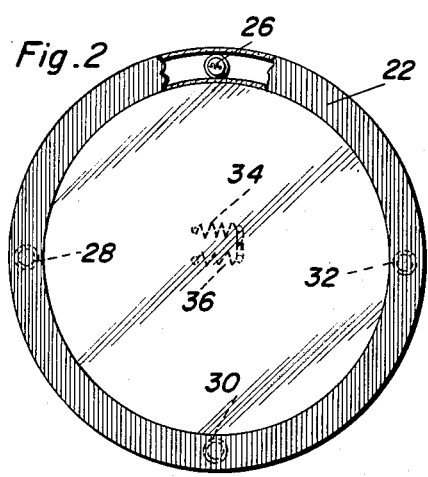
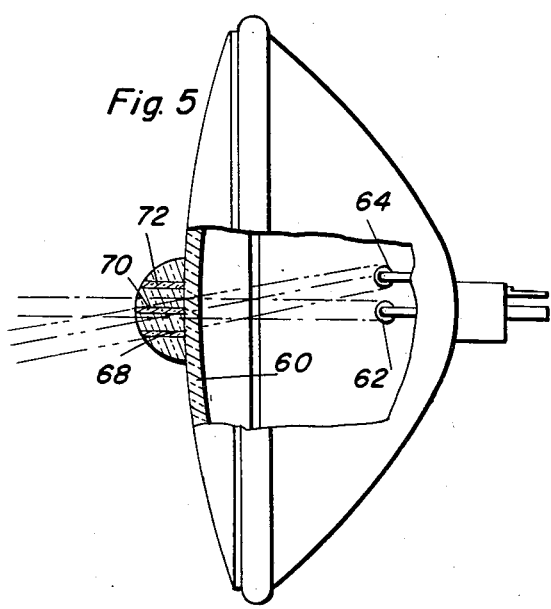
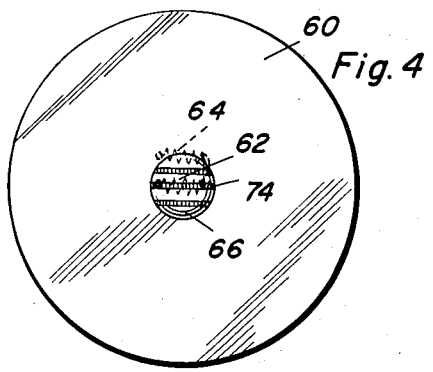
William F. Thompson
INVENTOR.
BY Clarence A. O'Brien
and Harvey B. Jacobson
Attorneys

United States Patent Office 2,828,407
Patented Mar. 25, 1958

2,828,407

DIMLIGHT INDICATOR

William F. Thompson, Union Springs, Ala.

Application August 30, 1956, Serial No. 607,089

2 Claims. (Cl. 240—7.1)

This invention relates to a dimlight indicator and has for its primary object the provision of means for automatically informing the operators of passing vehicles as to the condition of the headlights thereof.

Many lives are lost and serious injuries occur due to collisions involving vehicles which are approaching each other at night and especially in rainy weather where there is an excessive amount of reflection from wet pavement by glare from the vehicle headlights. In an effort to get operators of approaching automobiles to dim their lights, it is a common practice of the operators to change from dim to bright. This often causes sudden glares. Very often an approaching automobile may appear to have its bright lights on when it actually has the dim lights on. Thus, the changing from bright to dim not only requires an answering signal which increases glare but may not provide positive means of informing the approaching drivers as to the condition of their headlights. The present invention provides indicator means for assuring the driver of the condition of the headlights.

Still further objects and features of this invention reside in the provision of a dimlight indicator that is simple in construction, easy to install, capable of being utilized on conventional vehicles and which may be factory installed, and which vary in shape, size, coloring, and design as well as placement on various automobiles dependent on the different makes, models, and purposes thereof.

These, together with the various ancillary objects and features of the invention which will become apparent as the following description proceeds, are attained by these dimlight indicators, preferred embodiments of which have been illustrated in the accompanying drawings, by way of example only, wherein:

Figure 1 is an elevational view of one form of dimlight indicator constructed in accordance with the concepts of the present invention with a portion thereof being broken away for clarity;

Figure 2 is an elevational view of a modified form of the invention employing a ring shaped colored lens completely surrounding a headlight of a vehicle;

Figure 3 is an elevational view with parts being broken away to show other parts in section of a further modified form of the invention;

Figure 4 is an elevational view of another form of the invention employing an auxiliary lens having colored lens plates therein; and Figure 5 is a side elevational view with parts being broken away to show other parts in section of the form of the invention shown in Figure 4.

With continuing reference to the accompanying drawings wherein like reference numerals designate similar parts throughout the various views, and with initial attention directed to the embodiment of the invention in Figure 1, reference numeral 10 generally designates the headlight lens behind which the dim filament 12 and the bright filament 16 is positioned. Surrounding a portion of the lens 10 is a colored indicator lens 18 having a lamp 20 disposed therebehind. The lens 18 may be in the form of a casing and of any suitable shape and can be formed as a part of the headlight or separately mounted on the vehicle.

The lamp 20 is connected in series connection with the dim filament 12 so that when the dim filament 12 is excited, current will be supplied to the lamp 20 providing a positive visual indication that the dim lights are lit. When the bright filament 16 is excited, the dim filament 12 will not receive current nor will the lamp 20. The lens 18 may be colored as desired and a uniform color and size may be adopted by automobile manufacturers if considered desirable.

In Figure 2 there is shown a modified form of the invention wherein in lieu of the lens 18 a ring shaped lens 22 is employed having a plurality of lamps 26, 28, 30, and 32 disposed therebehind. The lamps 26, 28, 30 and 32 are connected in series connection with the dim filament 34. The headlight is of course provided with a bright filament 36.

In Figure 3 there is shown a further modified form of the invention in which the headlight 40 which is supplied with a dim filament 42 and a bright filament 44 is installed as is conventional on the vehicle. However, the dim light indicator which is generally indicated at 46 includes a lens 48 having a lamp 50 disposed therebehind. The lamp 50 may be connected in series connection with the filament 42 or may be actuated by the dim light switch normally controlling the supply of electrical energy to the filaments 42 and 44 or may be separately manually controlled as may be desired.

In Figures 4 and 5 there is shown another preferred form of the invention. In this form of the invention the headlight includes a lens 60 having a bright filament 62 and a dim filament 64 disposed therebehind. Affixed to as by a transparent cement or other suitable means is a lens 66 of an auxiliary nature which is preferably formed of glass or plastic and has relatively thin lens-like sheets or plates of colored transparent material as indicated at 68, 70, and 72 in Figure 5 and at 74 in Figure 4. Any suitable number of these plates may be utilized as desired it being noted that the beam in the light emanating from the bright filament 62 will pass through the lens 66 without causing many colored rays to emanate from the combined lens 60 and the lens 66. On the other hand, when the dim filament 64 is excited, because of the angle which the rays pass from the filament 64, a considerable amount of colored rays will emanate from the combined lens arrangement. These colored rays or colored light provide a visual indication of the condition of the headlamps. If suitable colored plates are utilized such as amber or the like, the combination will also serve quite satisfactorily as fog lights and for driving in other conditions of poor visibility.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination with a vehicle headlight including a headlight lens and a bright filament and a dim filament behind said lens, of a dimlight indicator for indicating the condition of the headlight comprising an auxiliary lens affixed to said headlight lens, at least one horizontally extending transparent lens colored plate in said auxiliary lens, and means holding said filaments in precisely located positions so that light from only one of said filaments will pass through said colored lens.

2. The combination with a vehicle headlight including a headlight lens and a bright filament and a dim filament behind said lens, of a dimlight indicator for indicating the condition of the headlight comprising an auxiliary lens affixed to the center of said headlight lens, said auxiliary lens being of substantially less diameter than said headlight lens and being substantially thicker than said headlight lens, a plurality of colored horizontally extending transparent lens colored plates in said auxiliary lens, and means holding said filaments in precisely located positions so that light from only one of said filaments will pass through said colored lens.

References Cited in the file of this patent

UNITED STATES PATENTS

| | | |
|---|---|---|
| 1,464,860 | Yasuda | Aug. 14, 1923 |
| 1,493,740 | Daum | May 13, 1924 |
| 1,827,305 | Udell | Oct. 13, 1931 |
| 1,849,695 | Scheidell | May 15, 1932 |
| 2,270,587 | Hall | Jan. 20, 1942 |
| 2,276,104 | Shaunessey | Mar. 10, 1942 |